US006951271B2

(12) United States Patent
Simpson et al.

(10) Patent No.: US 6,951,271 B2
(45) Date of Patent: Oct. 4, 2005

(54) FLIGHT LUG

(75) Inventors: Ronald Olin Simpson, Charlotte, NC (US); Larry James Mattson, Charlotte, NC (US)

(73) Assignee: Roberts Polypro, Charlotte, NC (US)

( * ) Notice: Subject to any disclaimer, the term of this patent is extended or adjusted under 35 U.S.C. 154(b) by 71 days.

(21) Appl. No.: 10/707,765

(22) Filed: Jan. 9, 2004

(65) Prior Publication Data
US 2005/0150745 A1   Jul. 14, 2005

(51) Int. Cl.[7] ............................................. B65G 47/31
(52) U.S. Cl. .............................. 198/461.1; 198/461.3; 198/459.1; 198/462.3
(58) Field of Search ........................ 198/461.1, 461.2, 198/461.3, 459.1, 462.3, 699, 731

(56) References Cited

U.S. PATENT DOCUMENTS

| | | | |
|---|---|---|---|
| 1,422,398 A | | 7/1922 | Wentz |
| 2,461,150 A | | 8/1949 | Flynn et al. |
| 2,556,920 A | | 6/1951 | Hills |
| 2,931,153 A | | 4/1960 | Daniels |
| 3,348,655 A | * | 10/1967 | Pierce Jr. et al. ........ 198/461.3 |
| 3,352,403 A | * | 11/1967 | Blake ...................... 198/461.1 |
| 3,382,965 A | * | 5/1968 | Pierce, Jr. et al. ....... 198/462.3 |
| 3,452,855 A | * | 7/1969 | Posen et al. ............. 198/461.1 |
| 3,559,796 A | | 2/1971 | Marks et al. |
| 3,580,388 A | * | 5/1971 | Resener ................... 198/690.2 |
| 3,679,045 A | | 7/1972 | Morgan et al. |
| 3,734,269 A | | 5/1973 | Ross |
| 4,124,113 A | * | 11/1978 | Trees ....................... 198/461.1 |
| 4,143,759 A | * | 3/1979 | Paradis .................... 198/690.2 |
| 5,249,665 A | | 10/1993 | Silzer et al. |
| 5,337,887 A | | 8/1994 | Greenwell et al. |
| 5,501,318 A | | 3/1996 | Disrud |
| 5,546,734 A | | 8/1996 | Moncrief et al. |
| 5,641,056 A | | 6/1997 | Lem |
| 5,735,378 A | | 4/1998 | Sundquist |
| 5,911,303 A | | 6/1999 | Malanowski |
| 6,000,528 A | * | 12/1999 | van Maanen ............ 198/461.1 |

* cited by examiner

Primary Examiner—Kathy Matecki
Assistant Examiner—Rashmi Sharma
(74) Attorney, Agent, or Firm—Moore & Van Allen PLLC; Michael G. Johnston

(57) ABSTRACT

A flight lug is provided for releasable attachment to a conveyor belt. The lug comprises a base and first and second side walls mounted to opposite edge surfaces of the base such that the base extends between and interconnects the side walls intermediate upper and lower ends of the side walls. Flanges extend inwardly from adjacent the lower ends of the side walls. Each flange defines a slot between the flange and the lower surface of the base for receiving an edge of the belt. The first side wall is pivotally attached to the base for movement relative to the base between a first position where the flange on the lower end of the first side wall is spaced a first distance from the flange on the lower end of the second side wall for allowing the belt to fit between the flanges, and a second position where the flanges on the side walls are spaced apart a second distance which is less than the width of the belt for capturing the belt in the slots between the side walls.

27 Claims, 5 Drawing Sheets

FLIGHT LUG

BACKGROUND OF INVENTION

This invention generally relates to a flight lug used in a conveyor system including one or more endless conveying belts for moving articles, and more particularly to a flight lug which is releasably fastened to a conveyor belt for selectively changing the position of, or replacing, the flight lug.

A conveyor system includes one or more continuous flexible conveyor belts movably supported on a framework. There are two general types of conveyor belts, chain belts and cord belts. Cord belts comprise polyurethane or similar suitable belt material surrounding fiber or steel cords. Cord belts are preferred over chain belts for high speed conveyor systems, or when cleanliness is a process requirement.

An array of spaced flight lugs are fixed along the length of a conveyor belt and project upwardly from the outer surface of the belt. The flight lugs are separated by a distance appropriate for individual articles being transported by the conveyor system, in effect, defining pockets which receive the articles. One or more flight lugs engage an article as the article is moved for properly positioning the articles on the conveyor belt and pushing the articles along in the direction of the path of travel.

Conventional flight lugs used on cord belts are formed from plastic. The plastic lugs are permanently welded, or vulcanized, directly onto the belt by melting the lug and the adjoining surface of the belt. However, vulcanized lugs are sometimes distorted which eventually results in tears at the edges of the belt. If a belt with welded plastic lugs is damaged or otherwise becomes jammed, the damaged lugs must be replaced in the field or the belt changed. Replacement of the lugs necessitates disassembly of the belt. This is a time consuming process resulting in significant labor costs and machine downtime, thereby increasing the overall cost associated with using a conventional conveyor system. Moreover, removal of a damaged lug that has been welded to the belt can damage the belt.

The pitch of a conveyor belt is determined by the space between the lugs. It is occasionally desirable to modify a conveying system for moving articles of different sizes, which requires changing the pitch of the belt. This is usually accomplished by moving the lugs toward or away from each other to accommodate smaller or larger articles, respectively. For example, a conveyor system running on a 12" pitch at a speed of 1000 feet per minute moves 1000 pieces per minute. If the article being moved will allow a 6" pitch, the conveyor system will move 2000 parts per minute with the belt running at the same speed. Unfortunately, since plastic lugs are permanently welded to the belt, the pitch of the belt cannot be easily changed. Therefore, a change in pitch requires that the belt be replaced by another belt with a different pitch.

For the foregoing reasons, there is a need for a flight lug which can be easily removed from a conveyor belt for repositioning or replacement to reduce the labor cost and machine downtime associated with a change in pitch or to repair a conveyor system. Ideally, the flight lugs should be adapted for use with a wide range of article configurations and sizes.

SUMMARY OF INVENTION

According to the present invention, a lug is provided for releasable attachment to a conveyor belt. The lug comprises a base having an upper surface, a lower surface and edge surfaces each extending between and interconnecting the upper surface and the lower surface of the base. First and second side walls are mounted to opposite edge surfaces of the base such that the base extends between and interconnects the side walls intermediate upper and lower ends of the side walls. A flange extends inwardly from adjacent the lower ends of each of the side walls, each flange defining a slot between the flange and the lower surface of the base for receiving an edge of the conveyor belt. The first side wall is pivotally attached to the base for movement relative to the base between a first position where the flange on the lower end of the first side wall is spaced a first distance from the flange on the lower end of the second side wall for allowing the belt to fit between the flanges, and a second position where the flanges on the side walls are spaced apart a second distance which is less than the width of the belt for capturing the belt in the slots between the side walls.

Also according to the present invention, a conveying system is provided for transporting objects along a path of travel during operation of the conveying system. The conveying system comprises a frame and a drivable endless conveying belt supported on the frame for movement in a direction of the path of travel. The belt has an inner surface and an outer surface. The outer surface of the belt forms an object conveying surface and the inner surface of the belt includes longitudinally spaced teeth extending transversely to the path of travel. A plurality of flight lugs are releasably mounted at spaced intervals along the belt in the direction of the path of travel. Each lug comprises a base having an upper surface, a lower surface and edge surfaces extending between and interconnecting the upper surface and the lower surface of the base. First and second side walls are integral with opposite edge surfaces of the base such that the base extends between and inter-connects the side walls intermediate upper and lower ends of the side walls. A flange extends inwardly from adjacent each of the lower ends of the side walls. Each flange defines a slot between the flange and the lower surface of the base for receiving an edge of the belt. The first side wall is pivotally attached to the base for movement relative to the base between a first position where the flange on the lower end of the first side wall is spaced a first distance from the flange on the lower end of the second side wall for allowing the belt to fit between the flanges, and a second position where the flanges on the side walls are spaced a second distance which is less than the width of the belt for capturing the belt in the slots between the side walls. The lug is positioned on the belt so that the flanges extending between the teeth on the inner surface of the belt.

BRIEF DESCRIPTION OF DRAWINGS

For a more complete understanding of the present invention, reference should now be made to the embodiment shown in the accompanying drawings and described below. In the drawings.

DETAILED DESCRIPTION

Certain terminology is used herein for convenience only and is not to be taken as a limitation of the present invention. For example, words such as "upper," "lower," "left," "right," "horizontal," "vertical," "upward," and "downward" merely describe the configuration shown in the FIGs. Indeed, the components may be oriented in any direction and the terminology, therefore, should be understood as encompassing such variations unless specified otherwise.

Figure 1:
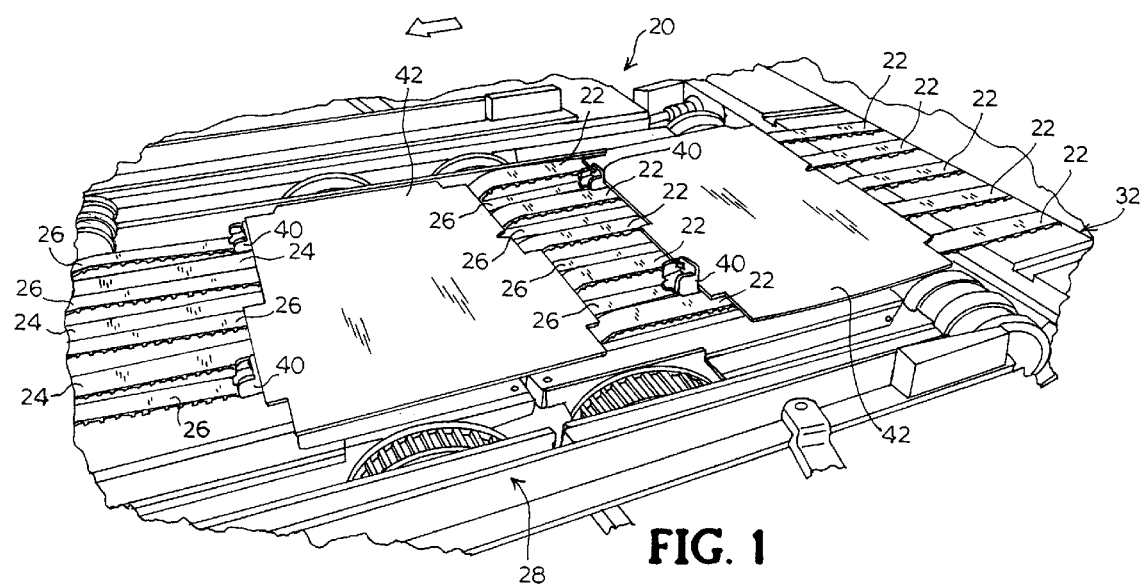
FIG. 1 is a perspective view of a portion of a conveyor system including several sets of conveyor belts and flight lugs secured to two of the belts according to the present invention.

Referring now to the drawings, wherein like reference numerals designate corresponding or similar elements throughout the several views, there is shown in FIG. 1 a portion of an exemplary conveyor system generally designated at 20. The conveyor system 20 comprises three series of continuous flexible conveyor belts which pass over pairs of toothed sprockets, none of which are visible in the FIG. 1. The conveyor belts are polyurethane belts with cord reinforcements, as is conventional. A first series of parallel belts 22 and a third series of parallel belts 24 are at the right and left most portions of FIG. 1, respectively. These belts include a urethane foam upper surface to provide a tacky grip. A second series of parallel belts 26 run between the first and third series of belts 22, 24. The three series of conveyor belts 22, 24, 26 run on a flat bed frame 28 having longitudinal grooves into which the belts fit. The belts move in the direction of a path of travel denoted by a reference arrow in the FIG. 1. The conveyor system 20 can be an indexing or continuous conveyor system.

A plurality of flight lugs 40 are positioned along two of the second series of conveyor belts 26 and protrude upwardly from the upper surface of the belts 26. The lugs 40 are disposed in longitudinal spaced relationship on the conveyor belts 26 thus forming a series of flights along a portion of the length of the conveyor system 20. The details of each lug 40 and its attachment to the belts 26 are described below.

A source of supply of articles (not shown) is disposed adjacent the upstream end 32 of the conveyor system 20. In the exemplary conveyor system 20 shown in FIG. 1, the articles are substantially flat, sleeve-type paperboard cartons 42 supplied from a carton magazine. The conveyor system 20 moves in synchronized relationship with the delivery of cartons 42 from the magazine. The cartons 42 are fed one at a time onto the first series of conveyor belts 22 moving in the direction of the path of travel. The first series of belts 22 are moving faster than the second series of conveyor belts 26 so that a carton 42 is accelerated by the first series of belts 22 onto the second series of belts 26. The lugs 40 on the second series of belts 26 flip into position between adjacent cartons 42 such that the cartons are received within the flights defined by the lugs 40. Two cartons 42 are shown in FIG. 1 as received within their respective flights on the second series of belts 26. The front edge of the cartons 42 engage the lugs 40 for positioning the cartons 42 squarely on the belts. The third series of conveyor belts 24 move at the same speed as the second series of belts 26. The third series of belts 24 pick up the cartons 42 with the help of a vacuum source holding the cartons 42 to the belts and moving the cartons 42 along the conveyor system 20 in the direction of the path of travel. It is understood that the conveyor system 20 could also be designed such that the lugs 40 come from behind the cartons 42 and engage the trailing edge of the cartons 42.

It is understood that the conveyor system shown in FIG. 1 and described above is merely exemplary of one application of the flight lug according to the present invention. The applicants do not intend to limit the present invention to only this conveyor system. Numerous other applications are contemplated. For example, the flight lugs could be adapted to receive other devices for engaging and transporting articles along a conveyor system. In this embodiment of the present invention, therefore, the flight lugs need not engage the articles to be moved by the conveyor system.

A flight lug 40 according to the present invention is shown in FIGS. 2–9. The flight lug 40 is generally chair-shaped, including a generally planar front wall 44 and opposed side walls 46, 48. A generally planar base 50 extends perpendicularly from the lower edge of the front wall 44 and is connected between the front wall 44 and the side walls 46, 48. The major portion of the base 50 is rectangular in plan view (FIGS. 4 and 5) with a central tab 52 extending from an edge of the base 50 opposite the front wall 44.

The flight lug 40 is preferably formed in one piece from a rigid durable high molecular weight plastic material such as HDPE. HDPE offers the benefits of ease of machinability coupled with a relatively low cost. Other suitable plastics include DELRIN, nylon and the like. The lug 40 may also be formed from natural or synthetic rubber or other elastomer such as, for example, ethylene, propylene, diene ter-polymer elastomer. Other suitable durable, rigid materials could also be used for the flight lugs 40 as long as the material is strong enough to avoid breaking or stress during operation. Moreover, the flight lug 40 may be of different heights and shapes to accommodate various article sizes and shapes.

Referring to FIGS. 6–9, the lower ends of the side walls 46, 48 extend downwardly from the base 50 and terminate in inwardly turned flanges 54, 56. Opposed parallel slots 58, 60 are defined by the lower ends of the side walls 46, 48, the lower surface 51 of the base 50 and the flanges 54, 56. The slots 58, 60 provide means for attaching the flight lug 40 to a conveyor belt, as will be described more fully below.

Figure 3:
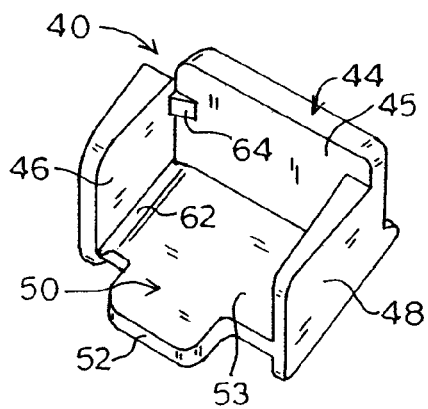
FIG. 3 is a perspective view of the flight lug shown in FIG. 2 in a locked position.
Figure 6:
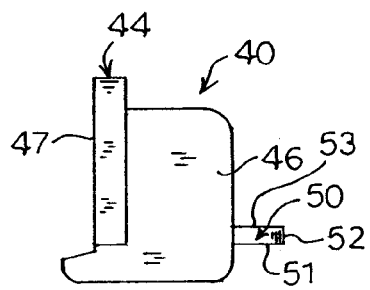
FIGS. 6 and 7 are side elevational views of the flight lug shown in FIG. 3.
Figure 8:
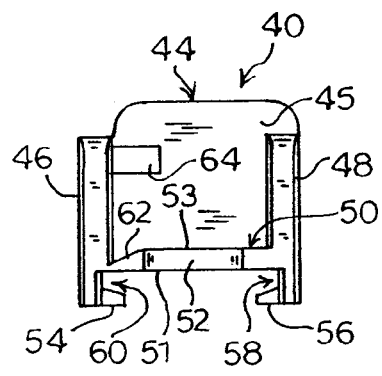
FIGS. 8 and 9 are rear and front elevational views, respectively, of the flight lug shown in FIG. 3.
Figure 7:
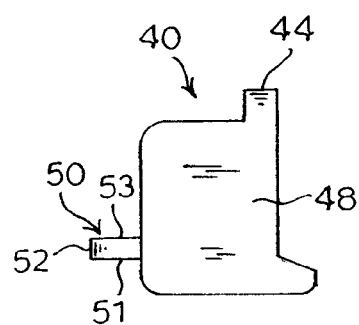
Figure 9:
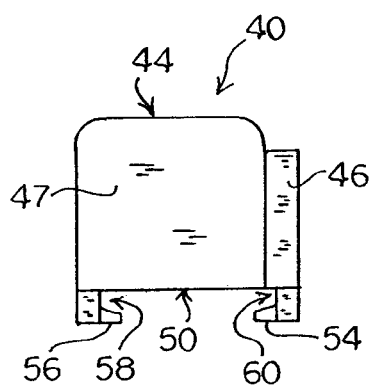

As best seen in FIGS. 3 and 8, a groove 62 is formed in the upper surface 53 of the base 50 at the junction of one of the side walls 46 and the base 50. The side wall 46 is also not connected to the adjacent edge of the front wall 44 (FIG. 6). This configuration allows the side wall 46 to pivot about an axis at the junction of the side wall 46 and base 50. One position of the pivoting side wall 46 is shown in FIG. 2 where the side wall 46 is angled inwardly toward the opposite side wall 48.

Figure 2:
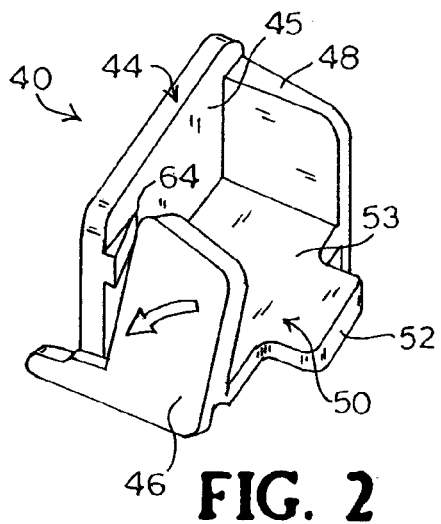
FIG. 2 is a perspective view of a flight lug according to the present invention.

Referring to FIGS. 2, 3 and 8, a detent 64 is integrally formed on the inner surface 45 of the front wall 44. The detent 64 comprises a transverse ramp extending furthest away from the inner surface 45 of the front wall 44 at the edge of the front wall 44 adjacent the pivoting side wall 46. The detent 64 is sized and positioned such that when the pivoting side wall 46 is rotated in the direction of the arrow in FIG. 2 to a second position where the side wall 46 is perpendicular to the base 50, the side wall 46 snaps into place behind the detent 64.

Figure 10:
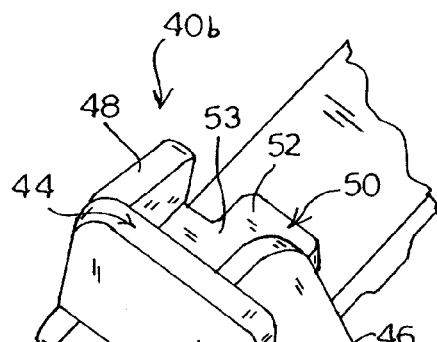
FIG. 10 is a top perspective view of a portion of a conveyor belt with two flight lugs in position on the belt according to the present invention with one of the flight lugs in an unlocked position and the other flight lug in a locked position.
Figure 10:
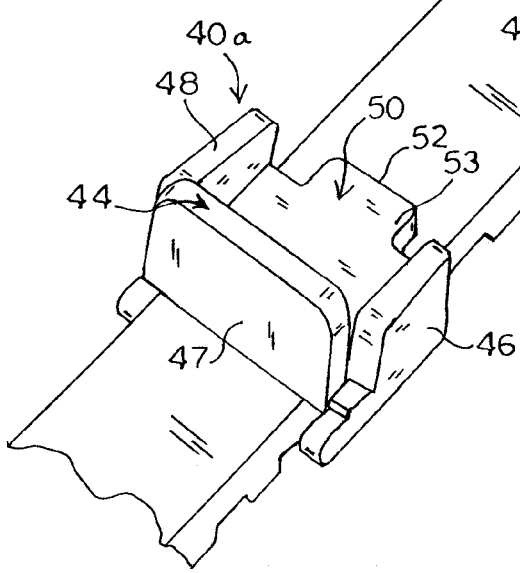
Figure 4:
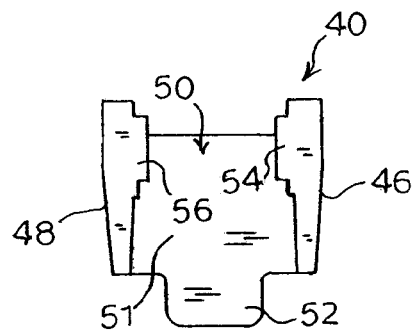
FIGS. 4 and 5 are bottom and top plan views, respectively, of the flight lug shown in FIG. 3.
Figure 5:
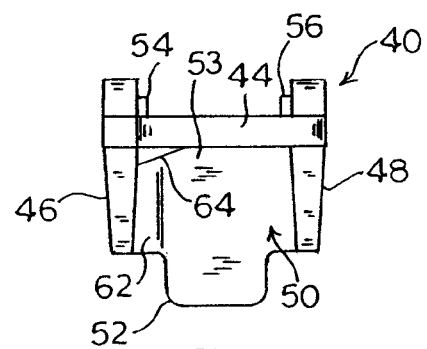
Figure 11:
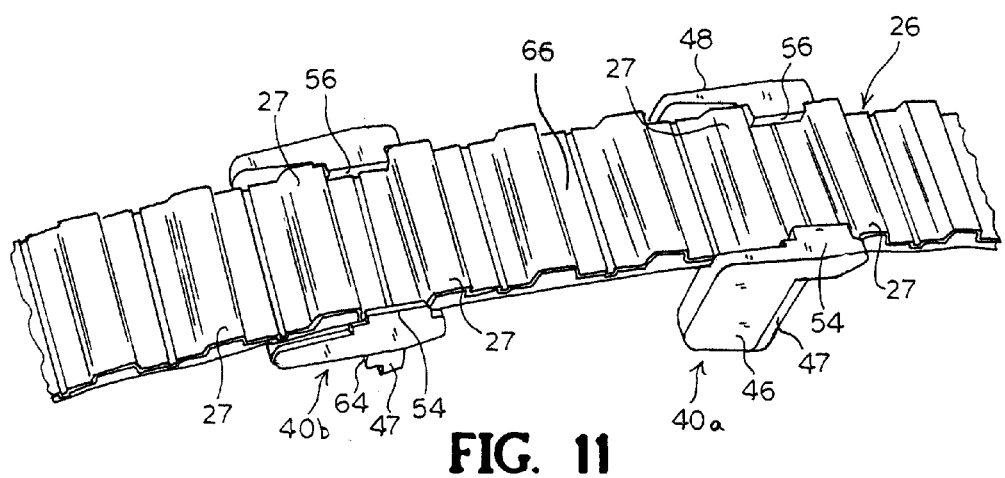
FIG. 11 is a bottom perspective of the conveyor belt and flight lugs shown in FIG. 10.

In use, a flight lug 40 according to the present invention is releasably attached to a conveyor belt by moving the pivoting side wall 46 from the first position, where the side wall 46 is angled inwardly toward the opposite side wall 48 (FIG. 2), to the second locked position, where the pivoting side wall 46 is behind the detent 64 (FIG. 3). This process is shown in FIGS. 10 and 11. Two flight lugs 40 are shown on a portion of a conveyor belt 26. The flight lug in the lower portion of FIGS. 10 and 11, generally designated at 40a, is in the second, or locked, position, and the other flight lug, generally designated at 40b, is in the first, or unlocked, position.

The first step in attaching the flight lug of the present invention to the conveyor belt 26 is to slip the belt into the slot 58 formed at the lower end of the rigid, non-pivoting side wall 48 such that the flange 56 fits between two of the teeth 27 on the inner surface 66 of the belt 26. Next, with the base 50 of the lug 40 held firmly against the upper surface of the conveyor belt 26, the pivoting side wall 46 is manually pushed outwardly. Outward movement of the pivoting side wall 46 causes the belt 26 to slip into the slot 60 on the pivoting side wall 46 with the flange 54 fitting between the same two teeth 27 on the belt 26 as the opposite flange 56. The user continues to push the pivoting side wall 46 outwardly until the wall slides over the detent 64. Once the side wall 46 is past the thicker end of the detent 64, the side wall 46 snaps into position thus locking the lug 40 on the belt 26.

When the flight lug 40 is the locked position on the conveyor belt 26, the belt 26 is captured in the slots 58, 60, which are sized and shaped to snuggly receive the conveyor belt 26 so that the lug 40 is firmly fixed to the belt 26. The flanges 54, 56 extend only partially across the inner surface 66 of the belt 26 thereby leaving space between the teeth 27 for engagement by the sprockets (not shown). The flat lower surface 51 of the base 50 of the lug 40 is against the upper surface of the conveyor belt 26 for further supporting the lug 40. This configuration minimizes tortional bending or twisting of the lug 40 during operation. The front wall 44 is generally perpendicular to the conveyor belt 26 and has an outer surface 47 facing in what could be a direction of travel of the conveyor belt 26 for engaging articles to be moved.

The flight lug 40 is removed from the conveyor belt 26 by reversing the procedure described above. That is, the pivoting side wall 46 is first moved away from the front wall 44 until the inner edge of the side wall 46 clears the detent 64. This releases the side wall 46, which is then pivoted inwardly toward the rigid side wall 48 so that the conveyor belt 26 slips out of the slot 60. The lug 40 is then moved slightly transversely of the conveyor belt 26 for freeing the belt from the other slot 58 at the lower end of the rigid wall 48. The lug 40 is then lifted off of the conveyor belt 26 and may then be reattached at another desired position.

Figure 12:
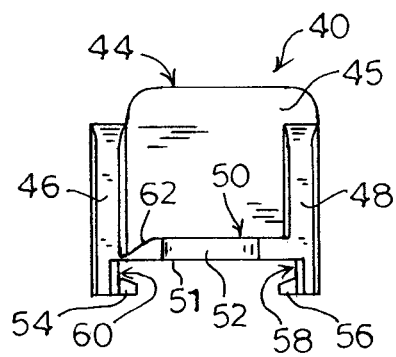
FIG. 12 is a rear elevational view of another embodiment of a flight lug according to the present invention.

Another embodiment of a flight lug 40 according to the present invention is shown in FIG. 12. In this embodiment, there is no detent 64. As described above, it is presumed that a device (not shown) for engaging and transporting articles along a conveyor system may be attached to the lug 40. Such device could also securely position the pivoting side wall 46 in the locked position. The device may a simple clip, or the device may be specifically designed for movement of a particular article. The latter is sometimes referred to in the art as a fill-block, which can vary in size as needed for various article size groupings and configurations.

Figure 13:
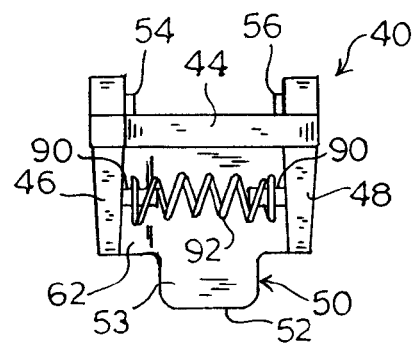
FIGS. 13 and 14 are top plan and rear elevational views, respectively, of yet another embodiment of a flight lug according to the present invention.
Figure 14:
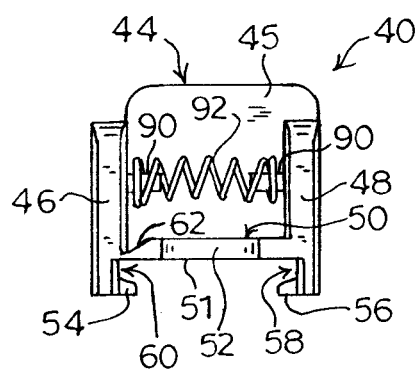

Still another embodiment of a flight lug 40 according to the present invention is shown in FIGS. 13 and 14. In this embodiment, there is no detent 64 for holding the pivoting side wall 46 in the locked position. Instead, two opposed posts 90 extend inwardly toward one another from the side walls 46, 48. A coil spring 92 fits over the posts 92 and between the side walls 46, 48. The spring 92 functions to bias the pivoting side wall 46 into the locked position. The lug 40 may be moved to the unlocked position by simply pinching the side wall 46, 48, which moves the pivoting side wall inward allowing the lug 40 to be removed form a conveyor belt.

It is understood that other embodiments of the present invention are possible, including an embodiment wherein both of the side walls 46, 48 are pivotally mounted to the base 50. This configuration of the flight lug 40 would obviate the need for the front wall 44 in some applications.

A flight lug according to the present invention has a number of advantages, including the ability to be quickly and easily removed and selectively positioned along the length of the conveyor belt without tools or fasteners. This allows a new pitch to be set on the same belt to accommodate articles of different sizes and shapes. No disassembly of the conveyor system is required and no prolonged work stoppage is necessary. Thus, costs associated with conventional flight lugs are reduced through reduced labor and minimized machine downtime during set-up and change over procedures and repair.

Although the present invention has been shown and described in considerable detail with respect to only a few exemplary embodiments thereof, it should be understood by those skilled in the art that we do not intend to limit the invention to the embodiments since various modifications, omissions and additions may be made to the disclosed embodiments without materially departing from the novel teachings and advantages of the invention, particularly in light of the foregoing teachings. For example, the lug has a number of applications including attaching various articles, such as hanging buckets, to any moving conveying system. Accordingly, we intend to cover all such modifications, omission, additions and equivalents as may be included within the spirit and scope of the invention as defined by the following claims. In the claims, means-plus-function clauses are intended to cover the structures described herein as performing the recited function and not only structural equivalents but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A lug for releasable attachment to a conveyor belt, the lug comprising:
  a base having an upper surface, a lower surface and edge surfaces extending between and interconnecting the upper surface and the lower surface of the base;
  a first side wall and a second side wall mounted to opposite edge surfaces of the base such that the base extends between and interconnects the side walls intermediate upper and lower ends of the side walls; and
  a flange extending inwardly from adjacent each of the lower ends of the side walls, each flange defining a slot between the flange and the lower surface of the base for receiving an edge of the conveyor belt,
  wherein the first side wall is pivotally mounted to the base for movement relative to the base between a first position where the flange on the lower end of the first side wall is spaced a first distance from the flange on the lower end of the second side wall for allowing the belt to fit between the flanges, and a second position where the flanges on the side walls are spaced apart a second distance which is less than the width of the belt for capturing the belt in the slots between the side walls.

2. A lug as recited in claim 1, wherein the first side wall is perpendicular to the base when in the second position.

3. A lug as recited in claim 1, wherein the base has a planar lower surface.

4. A lug as recited in claim 1, wherein the second side wall is fixed relative to the base.

5. A lug as recited in claim 1, further comprising a third wall extending upwardly from an edge of the base.

6. A lug as recited in claim 5, wherein the upper end of the second side wall is rigidly connected to the third wall for fixing the position of the second side wall relative to the base.

7. A lug as recited in claim 1, further comprising means for releasably securing the first side wall in the second position.

8. A lug as recited in claim 7, wherein the releasable securing means comprises means for biasing the first side wall to the second position.

9. A lug as recited in claim 7, further comprising a third wall extending upwardly from an edge of the base, and wherein the releasable securing means comprises a detent integral with the surface of the third wall facing the first side wall, the detent blocking movement of the first side wall from the second position except by moving the first side wall in a direction away from the third wall.

10. A lug as recited in claim 9, wherein the detent comprises an inclined cam surface extending furthest away from the surface of the third wall at the end of the cam surface closest to the edge of the third wall, the cam surface engaged by the first wall as the first wall moves from the first position to the second position where the first wall clears the end of the cam surface for securing the first side wall in the second position.

11. A lug as recited in claim 1, wherein the second side wall is pivotally mounted to the base for movement relative to the base between the first position and the second position.

12. A lug as recited in claim 11, further comprising means for releasably securing the first and second side walls in the second position.

13. A lug as recited in claim 12, wherein the releasable securing means comprises means for biasing the first and second side walls to the second position, the biasing means disposed between and engaging the inner surfaces of the side walls for biasing the walls apart.

14. A lug as recited in claim 12, further comprising a third wall extending upwardly from an edge of the base, and wherein the releasable securing means comprises a detent integral with the surface of the third wall facing the side walls, the detent blocking movement of the first and second side walls from the second position except by moving the side walls in a direction away from the third wall.

15. A lug as recited in claim 14, wherein the detent comprises an inclined cam surface extending furthest away from the surface of the third wall at the end of the cam surface closest to the edges of the third wall, the cam surface engaged by the side walls as the side walls move from the first position to the second position where the side walls clear the end of the cam surface for securing the side walls in the second position.

16. A conveying system for transporting objects along a path of travel during operation of the conveying system, the conveying system comprising:

a frame;

a drivable endless conveying belt supported on the frame for movement in a direction of the path of travel, the belt having an inner surface and an outer surface, the outer surface of the belt forming an object conveying surface and the inner surface of the belt including longitudinally spaced teeth extending transversely to the path of travel;

a plurality of flight lugs releasably mounted at spaced intervals along the belt in the direction of the path of travel, each lug comprising a base having an upper surface, a lower surface and edge surfaces extending between and interconnecting the upper surface and the lower surface of the base, a first side wall and a second side wall integral with opposite edge surfaces of the base such that the base extends between and interconnects the side walls intermediate upper and lower ends of the side walls, and a flange extending inwardly from adjacent each of the lower ends of the side walls, each flange defining a slot between the flange and the lower surface of the base for receiving an edge of the conveyor belt, wherein the first side wall is pivotally mounted to the base for movement relative to the base between a first position where the flange on the lower end of the first side wall is spaced a first distance from the flange on the lower end of the second side wall for allowing the belt to fit between the flanges, and a second position where the flanges on the side walls are spaced a second distance which is less than the width of the belt for capturing the belt in the slots between the side walls, the flanges extending between the teeth on the inner surface of the belt, wherein the lugs form a spaced series of flights along the outer object conveying surface of the belt.

17. A conveying system as recited in claim 16, wherein the lugs engage the objects for positioning or moving the objects as the objects are conveyed in the direction of the path of travel.

18. A conveying system as recited in claim 16, further comprising means secured to the lugs for engaging the objects for positioning or moving the objects as the objects are conveyed in the direction of the path of travel.

19. A conveying system as recited in claim 16, wherein the first side wall is perpendicular to the base when in the second position.

20. A conveying system as recited in claim 16, wherein the base has a planar lower surface.

21. A conveying system as recited in claim 16, wherein the second side wall is fixed relative to the base.

22. A conveying system as recited in claim 16, further comprising a third wall extending upwardly from an edge of the base.

23. A conveying system as recited in claim 22, wherein the upper end of the second side wall is rigidly connected to the third wall for fixing the position of the second side wall relative to the base.

24. A conveying system as recited in claim 16, further comprising means for releasably securing the first side wall in the second position.

25. A conveying system as recited in claim 24, wherein the releasable securing means comprises means for biasing the first side wall to the second position.

26. A conveying system as recited in claim 24, further comprising a third wall extending upwardly from an edge of the base, and wherein the releasable securing means comprises a detent integral with the surface of the third wall facing the first side wall, the detent blocking movement of the first side wall from the second position except by moving the first side wall in a direction away from the third wall.

27. A conveying system as recited in claim 25, wherein the detent comprises an inclined cam surface extending furthest away from the surface of the third wall at the end of the cam surface closest to the edge of the third wall, the cam surface engaged by the first wall as the first wall moves from the first position to the second position where the first wall clears the end of the cam surface for securing the first side wall in the second position.

* * * * *